April 23, 1929.    P. A. JORGENSON    1,710,421
POTATO CUTTER
Filed Jan. 22, 1927    2 Sheets-Sheet 1

Inventor
Peter A. Jorgenson,

By Clarence A. O'Brien
Attorney

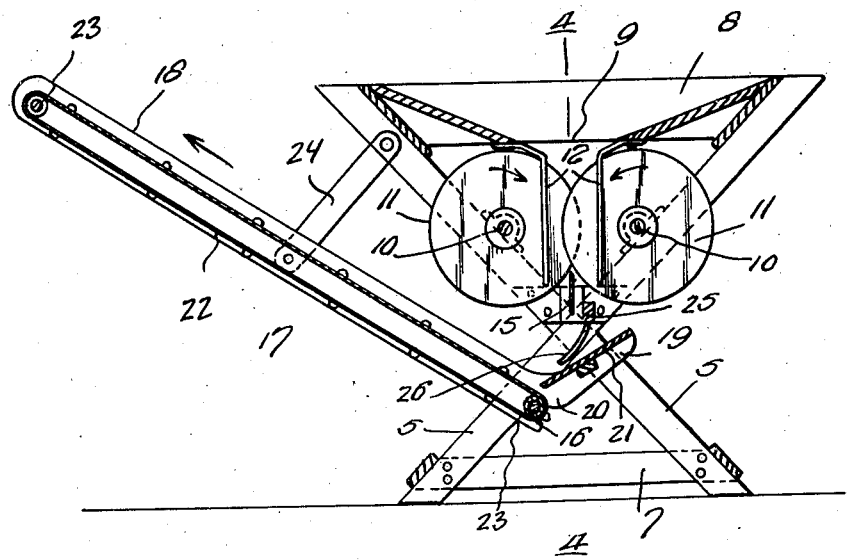
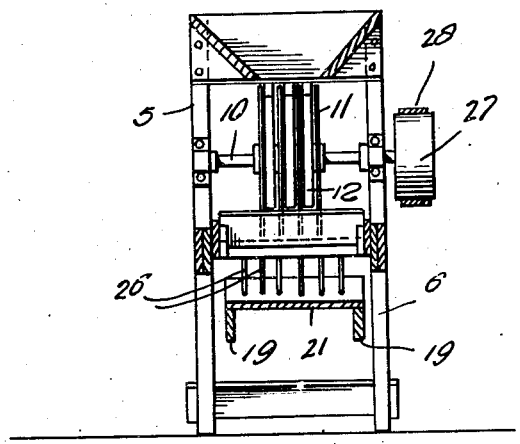
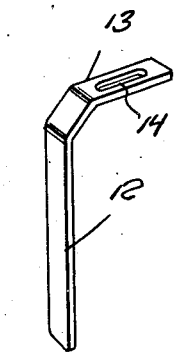

Patented Apr. 23, 1929.

1,710,421

UNITED STATES PATENT OFFICE.

PETER A. JORGENSON, OF WATERTOWN, SOUTH DAKOTA.

POTATO CUTTER.

Application filed January 22, 1927. Serial No. 162,840.

This invention relates to new and useful improvements in potato cutters and has for its primary object to provide a highly novel, simple device of this character that is constructed for cutting seed potatoes into small cubes of uniform size so as to facilitate the rapid and proper planting thereof.

The invention further aims to provide a potato cutter of this character that has means for catching the potatoes as the same are delived from the cutting mechanism and conveying the same away from the said mechanism to a suitable point of discharge.

A further and important object is to provide a potato cutter of this character that may be operated efficiently and rapidly by a small gasoline engine, electric motor or the like.

With the foregoing and other objects in view as the nature of the invention will be better understood, the same comprises the novel form, combination and arrangement of parts hereinafter more fully described, shown in the accompanying drawings and claimed.

In the accompanying drawings wherein like numerals of reference indicate corresponding parts throughout the several views:

Figure 3 is a horizontal section.

Figure 4 is a detail vertical section taken substantially upon the line 4—4 of Figure 3, and Figure 5 is a perspective of one of the rotary cutting blade spacers that forms an essential feature of the present invention.

Figure 1:
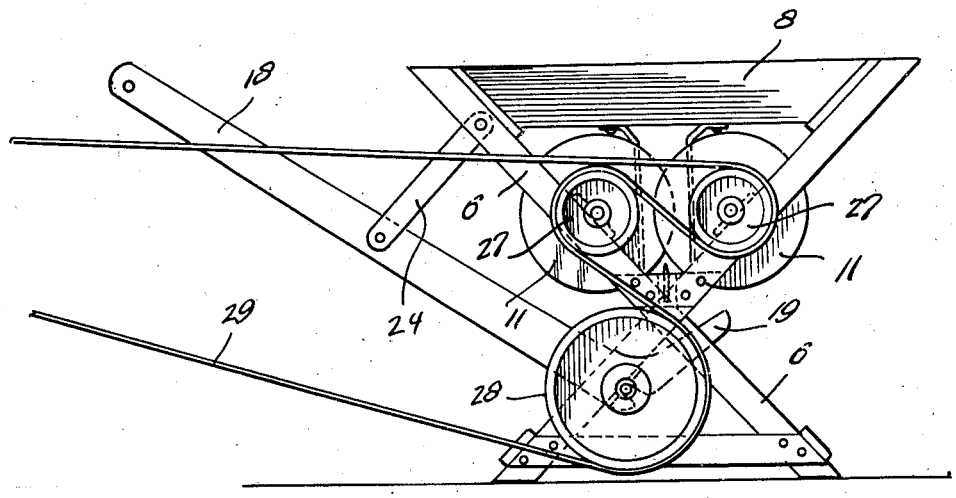
Figure 1 is a side elevation of my new and improved potato cutter.
Figure 2:
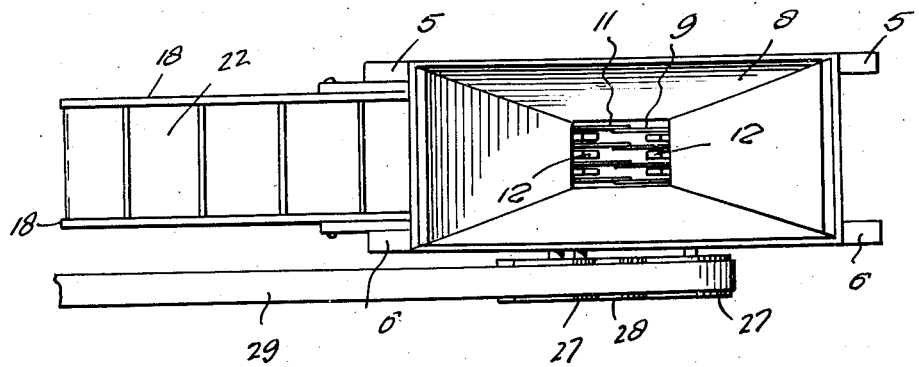
Figure 2 is a top plan view thereof.

Now having particular reference to the drawings, my potato cutter consists of a supporting stand including pairs of cross legs 5—5 and 6—6 respectively, all of which are suitably braced at their lower ends as at 7. Rigidly supported within the upper ends of these legs is a substantially rectangular shaped inclined hopper 8, the bottom of which is formed at its center with a discharge opening 9. Journaled within bearings at the inner edges of the legs 5—5 and 6—6 directly beneath the hopper 8 is a pair of transverse cross shafts 10—10, while keyed thereon directly beneath the opening 9 are spaced rotating cutting blades 11. The blades of one shaft are disposed between and overlap the blades of the other shafts as clearly indicated in Figures 1, 2 and 3. Depending from the bottom of the hopper 8 at the front and rear ends of the opening 9 therein are metallic straps 12 that engage between the rotary blades 11 upon the shafts 10—10. The lower ends of these straps terminating slightly above the edges of the blades as in Figure 3. The upper outwardly bent ends 13 of these straps are formed with longitudinal slots 14 to permit the securing of the same to the hopper. Obviously these straps 12 are for the purpose of guiding the potatoes in their downward movement and for preventing the potatoes from being forced inwardly upon the cutting blades of either of the shafts 10. Furthermore these straps effect means for wiping the cut potatoes from the blades as the same are carried downwardly thereby, which blades rotate in a direction toward each other as indicated by the arrows in Figure 3.

Directly beneath and between the blades upon the shafts 10—10 is a transversely arranged stationary cutting knife 15 secured at its opposite ends to the pairs of legs at opposite sides of the machine. This blade is for the purpose of further cutting the potatoes in a direction at right angles to the cut imparted by the blades 11 with the result that the potatoes are cut into small pieces.

Extending transversely between the rearmost legs of the machine frame is a stationary bar 16 for the purpose of supporting the lower end of an endless conveyor designated generally by the reference character 17. This endless conveyor consists of a pair of side boards 18—18 of relatively narrow configuration the lower ends of which are formed with upwardly projecting substantially right angular foot like extensions 19—19 the heel portions of which are notched as at 20 for engagement over the previously mentioned bar 16. Extending transversely between said foot like extensions 19 is an inclined board 21 that is positioned directly beneath the rotating cutting blades 11 and the stationary cutting blade 15.

The conveyor 17 further includes an endless belt 22 trained around rollers 23—23 between the opposite ends of the side boards 18, the lower roller 23 being disposed around the stationary bar 16 of the cutter frame. Interconnecting the side boards 18 and the rearmost legs of the frame are plate links 24—24.

Arranged transversely between the legs of the cutter frame at the lower edge of the stationary blade 15 and at the forward side thereof is a cross bar 25 depending from which are curved spring fingers 26 upon which the potatoes from the blades will fall after which they will pass onto the inclined board 21 and eventually find their way to the endless belt 22 to be carried upward to a point of discharge.

Adjacent ends of the blade shafts 10—10 as well as the lower roller 23 of the endless conveyor are equipped with belt pulleys 27—27 and 28, respectively, the pulley 28 being of relatively greater size than the pulleys 27. Trained around these pulleys in such a manner as to cause the rotation of the blades 11 in the direction of the arrows, Figure 3, and the movement of the endless conveyor in the direction of the other arrow in said Figure 3 is an endless belt 29 that is extended to a source of power for obviously causing the operation of the rotating knives and said conveyor.

It will thus be seen that I have provided a highly novel, simple and efficient potato cutter that is well adapted for all the purposes heretofore designated and even though I have herein shown and described the invention as consisting of certain detail structural elements it is nevertheless to be understood that some changes may be made therein without affecting the spirit and scope of the appended claims.

Having thus described the invention, what I claim is:—

1. In combination, a potato cutter including a stand, a potato hopper arranged in the top of the stand and having a discharge opening in its bottom, co-acting cutting means mounted beneath the hopper at opposite sides of the opening, an inclined endless conveyor attached at one end to the stand below the cutting means, a bar extending transversely below the cutting means, a series of spring fingers depending from said bar, the lower ends of said fingers being curved in a direction toward the endless conveyor, said spring fingers providing a means for receiving the cut potatoes from the cutting means, and an inclined board underlying the spring fingers for delivering the cut potatoes onto the endless conveyor.

2. In combination, a potato cutter comprising a stand, a potato hopper arranged in the top of the stand and having a discharge opening, cutting mechanism arranged below the hopper for cutting the potatoes into small pieces, an inclined endless conveyor including a pair of side boards, the lower ends of said side boards being formed with upwardly projecting extensions, an endless conveyor arranged between the side boards, said endless conveyor being secured adjacent its lower end on the lower rear portion of the stand, a board extending transversely across the upwardly projecting extension formed on the lower ends of the side boards of the conveyor, a bar extending transversely below the cutting mechanism and above said board, and a series of spring fingers depending from said bar, the lower ends of said fingers being curved to provide cushioning means for the cut potatoes as the same fall upon said spring fingers after passing through the cutting mechanism, said board underlying the spring fingers for delivering the cut potatoes onto the endless conveyor.

In testimony whereof I affix my signature.

PETER A. JORGENSON.